United States Patent

Pulici

[15] 3,669,007
[45] June 13, 1972

[54] METHOD AND APPARATUS FOR ROLLING AND TUCKING FILLED FOODSTUFFS

[72] Inventor: Louis Pulici, 1202 Point View Street, Los Angeles, Calif. 90035

[22] Filed: June 22, 1970

[21] Appl. No.: 47,951

[52] U.S. Cl................................99/450.6, 425/110, 425/391
[51] Int. Cl..........................................................A23g 3/00
[58] Field of Search..........................107/1 R, 1 A, 1 E, 54 D; 18/11, 13, 36; 100/35

[56] References Cited

UNITED STATES PATENTS

| | | | |
|---|---|---|---|
| 2,855,867 | 10/1958 | Zeitlin | 107/1 A |
| 3,230,901 | 1/1966 | Zones | 107/1 E |
| 3,450,067 | 6/1969 | Kao | 107/1 R |

*Primary Examiner*—James R. Boler
*Attorney*—Wm. Jacquet Gribble

[57] ABSTRACT

The method and apparatus take an outer food wrap or envelope and place it upon one of a plurality of continuously moving platens, each with a hinged section, upon a conveyor and processes each platen with its wrap beneath an automatic filler tank. The hinged portion of the platen is then folded to make a first transverse fold in the wrap about the filler, and then the wrap is engaged with opposed reciprocating transverse forks which roll the filled wrap upon itself about a line transverse to the conveyor travel. The rolled foodstuff is then sprayed with a binder liquid and passed between compression belts which compress the outer wrap edge to the first outer roll layer.

Foodstuffs which are tucked as well as rolled may, after the first partial fold is made, be passed between converging guides which plow the longitudinal edges of the wrap upwardly and inwardly to form side tucks which then are also rolled with the body of the wrap and filler by the method and apparatus described above. Preferably the engaging forks are caused to rotate by a gear and rack arrangement which supports the forks on opposite sides of the conveyor such that they may be cammed toward and away from the conveyor platens.

20 Claims, 10 Drawing Figures

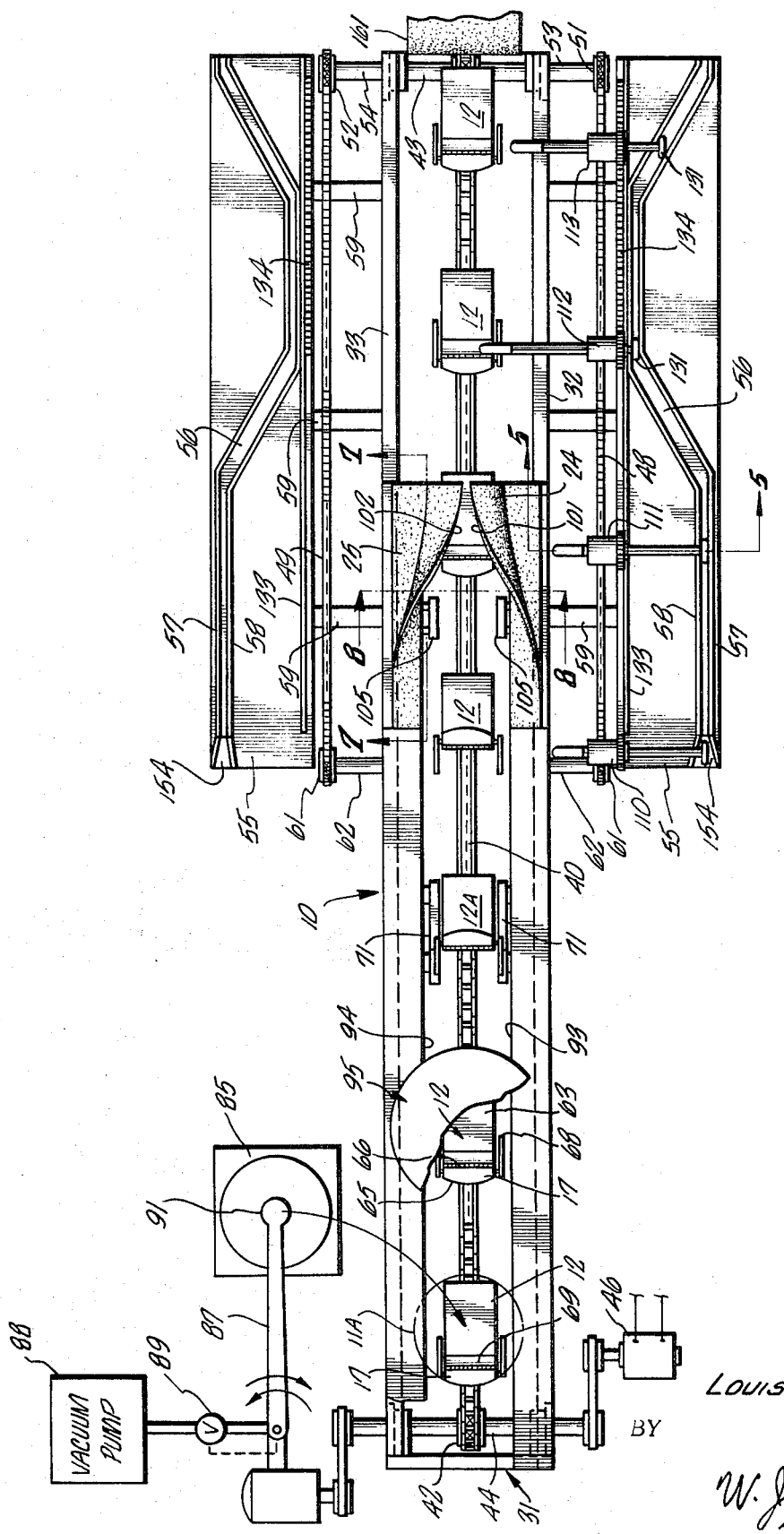

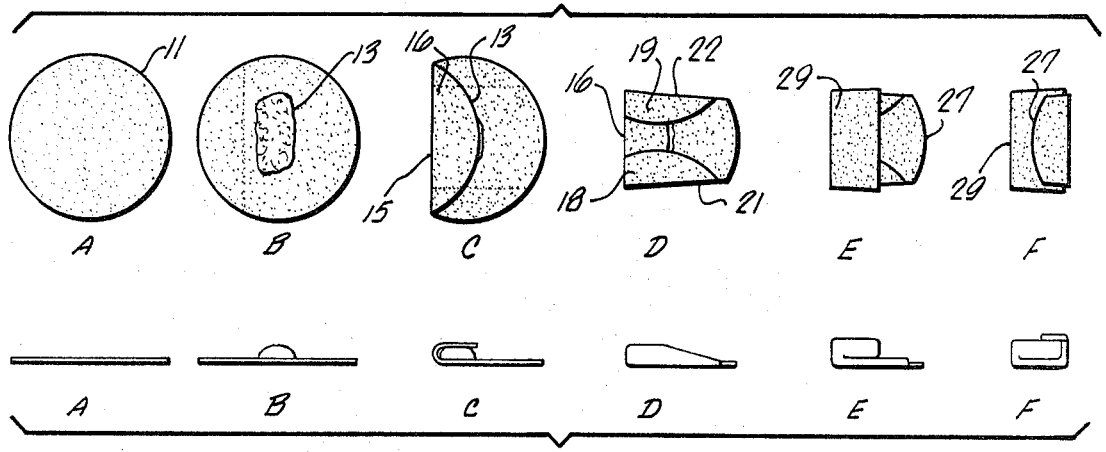
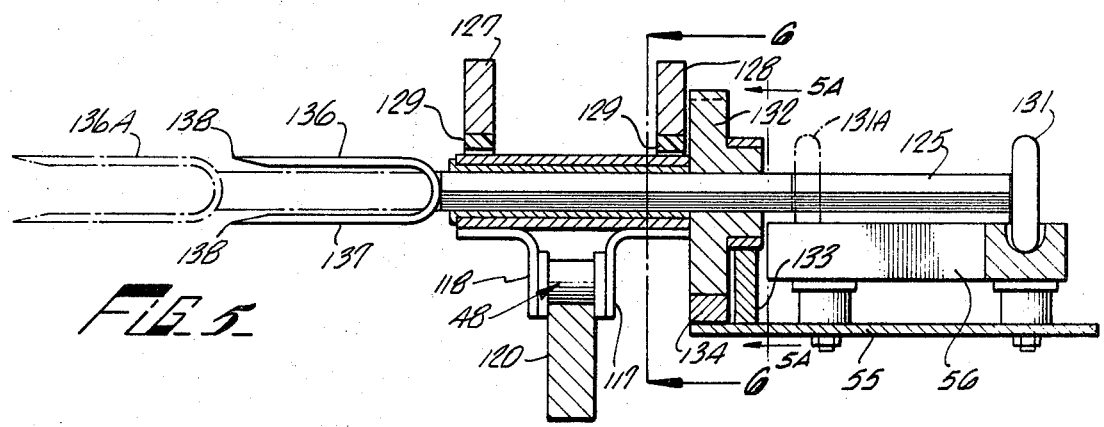
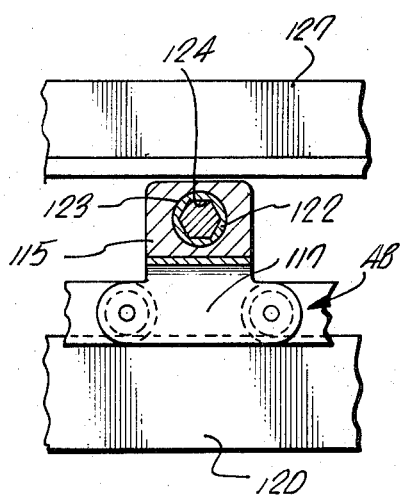
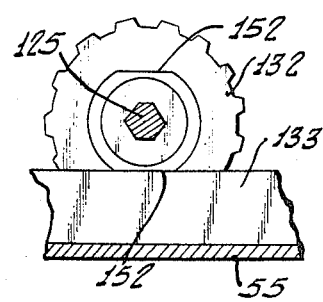

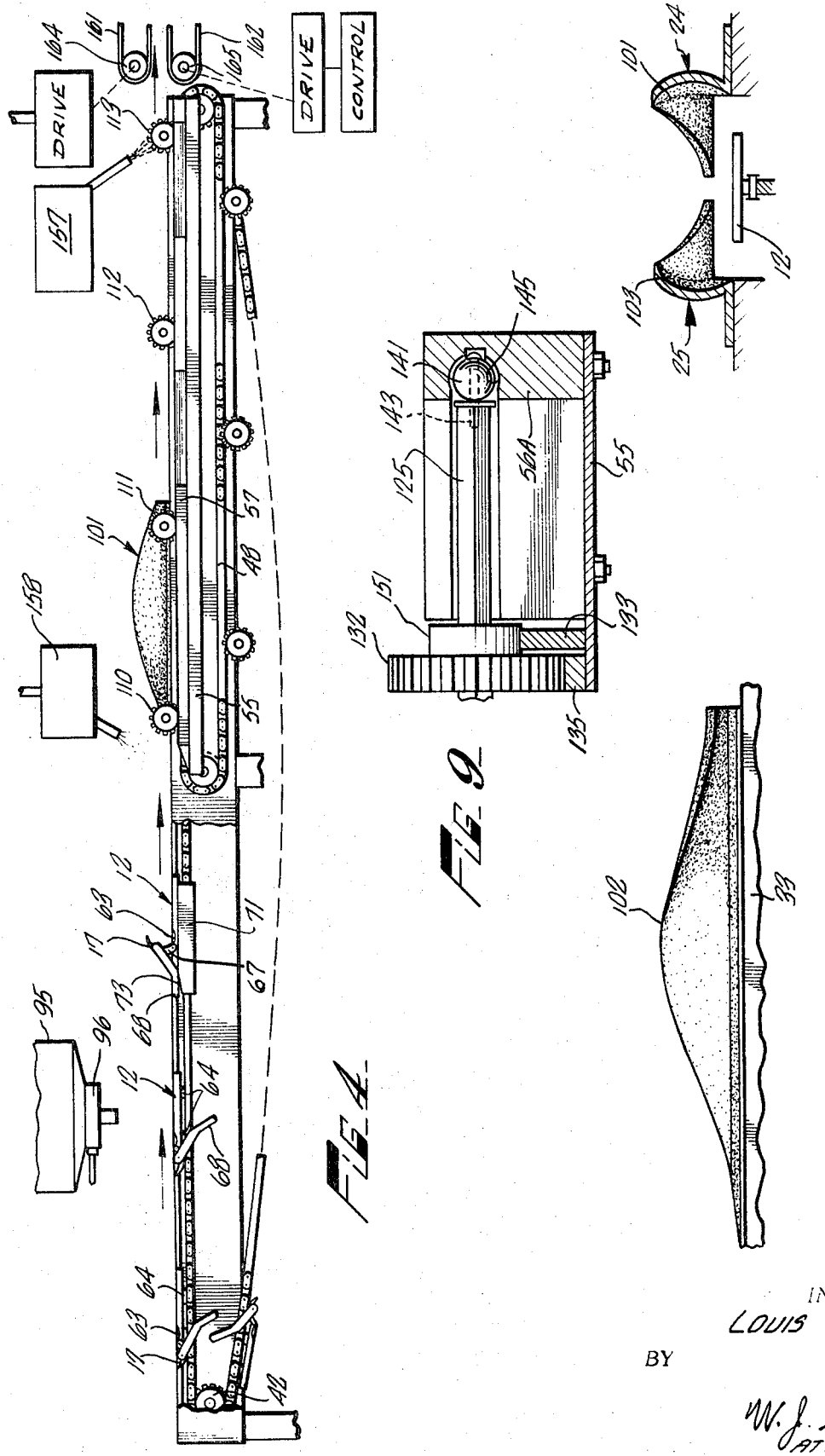

METHOD AND APPARATUS FOR ROLLING AND TUCKING FILLED FOODSTUFFS

BACKGROUND OF THE INVENTION

Certain rolled foodstuffs and rolled and tucked foodstuffs are conventionally manually formed. Examples of such foodstuffs are Mexican foods, such as burritos and enchiladas, Chinese egg rolls and foods of European origin, such as cabbage rolls, blintzes and canneloni. These foods have in common a configuration including an outer wrap or waferlike cover and a pliant or plastic inner filler. The wrap and its filler are conventionally rolled in a spiral or may have the edges folded transversely to the spiral axis prior to rolling in a tuck and roll configuration. The machinery industry has yet to develop a dependable machine which can outproduce dexterous manual manipulators. However, factors such as human fatigue, inattention and labor shortages have made automatic food handling apparatus desirable. The present invention aims to provide a method, and apparatus to practice the method, whereby a superior rolled or rolled and tucked food product may be made with minimum manual manipulation.

SUMMARY OF THE INVENTION

The invention relates to process and apparatus for preparing foodstuffs wherein the process includes the steps of depositing an outer flat wrap or wafer envelope form on a continuous conveyor, adding a filler substance on the flat wrap, and making a first fold in the wrap along a line transverse to the travel of the conveyor. The process may include the further step of folding over opposite side margins of the wrap about the filler along lines parallel to the path of the conveyor.

The filled wrap is then engaged with transversely extending pairs of forks or fingers from opposite sides of the line of the conveyor. The fingers are rotated about an axis transverse to the line of the conveyor to roll the partially folded wrap spirally upon itself. The fingers are withdrawn from engagement with the rolled envelope or wrap and the exposed transverse margin of the wrap is adhered to the next adjacent layer of the roll. The rolled envelope is then passed beneath compressing or further rolling belts so as to alter the rolled thickness of the wrap and filler and to insure a bond between the exposed margin and the next adjacent layer of the now rolled foodstuff.

The contemplated apparatus for practicing the method of the invention is a unique combination including a plurality of support platens on a conveyor in which each platen has a static portion and an articulated portion. The combination also includes a filling station with means for depositing a filler onto a food wrap positioned on each platen, and means for moving the articulated section of each platen after filling to partially fold the wrap or envelope along a line transverse to the travel of the conveyor. In a preferred embodiment of the invention, folding means adjacent the conveyor on each side thereof fold each marginal edge of the wrap inwardly along a line parallel to the conveyor travel. Each of a second conveyor adjacent the first platen-carrying conveyor and a third conveyor oppositely adjacent the first conveyor carries a plurality of transversely extending finger pairs or forks. Synchronizing means coordinate the travel of the three conveyors. Each of the second and third conveyors includes means for rotating each of the fork pairs and for moving each pair into engagement with the filled wrap carried on the platen of the first conveyor. The apparatus includes means for disengaging each fork pair on a conveyor from the rolled wrap and further includes a bonding medium dispenser adapted to dispense bonding liquid onto the rolled wrap. Longitudinally extending compression means compact each rolled wrap and filler on the first conveyor and delivers each for packing or further processing.

In the preferred embodiment suction pick-up means may be used to convey the envelopes or wraps from a supply stack to the platens of the first conveyor. Conventional automatic filling means may be used in combination with the conveyor to deposit metered amounts of filler on each wrap on a conveyor platen. Since many of the foodstuffs use envelopes or wraps of a flour paste, the bonding medium liquid may be water.

The method and apparatus of the invention disclosed herein accomplish the objectives of manipulating a food wrap and filler into a rolled food article or a rolled and tucked food article automatically and rapidly in a manner utilizing a unique method and conveying apparatus and controls having easily fabricated elements, resulting in a method and machine easy to operate and economical to fabricate.

These and other advantages and objects of the invention will be apparent from the following detailed description and drawing.

BRIEF DESCRIPTION OF THE DRAWING

FIG. 1 is a schematic plan view of apparatus in accordance with the invention;

FIG. 2 is a plan diagram of six stages in the practice of the process of the invention;

FIG. 3 is an elevational view of the stages of FIG. 2;

FIG. 4 is a fragmentary elevational view schematically illustrating the apparatus of FIG. 1;

FIG. 5 is a sectional elevation taken on line 5—5 of FIG. 1; and FIG. 5A is a sectional view taken along line 5A — 5A of FIG. 5;

FIG. 6 is a sectional view taken on line 6—6 of FIG. 5;

FIG. 7 is a longitudinal section taken on line 7—7 of FIG. 1;

FIG. 8 is a transverse section taken on line 8—8 of FIG. 1; and

FIG. 9 is a fragmentary section of an alternate embodiment of the invention.

DESCRIPTION OF THE PREFERRED EMBODIMENT

The apparatus 10 of FIG. 1 accomplishes the process of the invention. The apparatus has loading, filling, transverse folding, longitudinal folding and rolling sections, in addition to a final compressing and binding section. The various sections combine to accomplish the process, which is productive of the illustrative food item shown in FIGS. 2 and 3 in its various stages. The particular food product shown in FIGS. 2 and 3 is a "burrito," which usually comprises a circular tortilla wrap made from a wheat paste and a pasty filler of a material like refried beans or a ground meat mixture. Burritos are first filled, then tucked and rolled, and then warmed just prior to serving. The apparatus accomplishes the filling, tucking and rolling steps.

In FIG. 2 the burrito is shown in plan view in six progressive forms, A through F. The correlative stages are shown in elevation in FIG. 3 in stages A through F. At A the tortilla or wrap 11 is substantially flat as it might rest upon a conveyor platen 12 of the apparatus of FIG. 1. At B a filler, such as a bean paste 13, is shown deposited upon the tortilla. A transverse fold 15 along a chord of the tortilla (C) results in an overlapping flap 16 which partially covers the filler. Preferably, this first fold is accomplished by an articulated portion 17 of the platen.

At D longitudinal flaps 18 and 19 are formed from the tortilla by folds along longitudinal chords 21, 22 which may intersect the first flap 16. Preferably this second fold operation is performed by spaced side plows 24, 25. At E the twice-folded tortilla and its filler is rolled upon itself, leaving an outer margin 27. In the case of burritos, a binder liquid, such as water, is applied to the outer roll layer 29 of the rolled food product and margin 27 is then compressed downwardly upon the outer roll such that the rolled configuration is preserved by the adhesion of one layer to the other. Preferably burritos are flattened such that the rolled object is an oblate tube rather than cylindrical. The burritos are conventionally packed and stored after rolling and tucking until ready for warming at the time of consumption.

One embodiment of the apparatus of the invention suited to the practice of the process is illustrated in FIG. 1 and FIGS.

4-6. Processing machine 10 is shown schematically since its physical configuration may vary greatly, depending upon the power source and the conveyor mode used. In the illustrative embodiment the machine 10 has a frame 31 with spaced horizontal side rails 32, 33 between which a main conveyor 40, which may be a rail-supported chainlink belt, extends over end sprockets 41, 42 supported on axles 43, 44, respectively. Axle 44 may be linked by suitable means to a power source, such as an electric motor 46. Shorter secondary conveyors 48, 49 oppositely outboard of side rails 32, 33 of the frame may comprise rail-supported chainlink conveyors driven by sprockets 51, 52 on extending shanks 53, 54, respectively, of axle 43. Outboard of each secondary conveyor is an attached platform 55 having a longitudinal cam track 56 with outer and inner guide rails 57, 58, respectively. Each platform is fixed to frame 31 by a plurality of transverse ties 59. Each secondary conveyor passes over an upstream sprocket 61 supported by a shaft 62 in a journal (not shown) on one of the side rails of the frame.

The first conveyor 40 supports a plurality of equally spaced articulated platens 12. Each platen has a flat static section 63 in addition to the cupped articulated section 17, the static section being secured to the conveyor chain by links 64. (See FIG. 4.) The articulated section 17 has two separately hinged portions 65, 66. Each hinged portion is slightly cupped longitudinally and they are linked by an arcuate arm 67 to a cam dog 68 (See FIG. 4). Each cam dog extends downwardly and forwardly with respect to the conveyor chain when in nonarticulated condition. A concave platen section 69 adjoins the hinge. A cam rail 71, preferably supported from the side rails of the frame, has a sloping frontal cam surface 73 against which the cam dog of each platen strikes and rides to lever the articulated portions of the platen upwardly and forwardly, as shown at platen 12A.

A stack 85 of tortillas or other outer wraps for the foodstuff being processed by the machine is located near the upstream end of the conveyor. While many mechanisms may be utilized to place a single wrap on the moving platen, it is presently preferred to use a vacuum pick-up arm, such as the arm 87, operated by suitable linkage from shaft 44 in synchronism with the continuously moving conveyor. A vacuum pump 88 is connected to the arm and a valve 89 controlled by arm position controls the interval of suction at an arm suction head 91 such that a tortilla is picked from the stack, swung arcuately above a platen and released. As can be seen from the dotted wrap position 11A, the wrap overhangs the platen. The overhang is supported by elongate plates 93, 94 extending from each side rail. The overhanging portions of the wrap are those portions which are tucked toward the central line of the wrap during the tuck and roll process.

It is desired to deposit a metered amount of filler upon each passing wrap as the conveyor platen carries it along. There are conventional filling devices which can accomplish this purpose. It is presently preferred to use a filler supply tank 95, suspended above the path of the first conveyor, and having a metering valve 96 controlled by the movement of the conveyor. Such a supply unit is conventional and the particular form and its control forms no part of this invention and is therefore not described in detail. The filler supply may be suspended from the side rails between the platen receiving position and the cam rail 71. The filler is thus in place on the wrap prior to articulation of the platen and wrap by the platen cam dog.

The articulated portion of the platen is retracted from contact with the wrap as the platen and food item traverse spaced side fold guides 101, 102, which parallel the main conveyor. The sloping elevated cam dogs of each platen contact a cam return 105, shown in FIG. 1, and about level with the raised position of articulated portion 17; such that the food item, in this case a burrito, is free to be rolled upon itself upon emerging from the fold guides, the cam returns 105 depressing the upper ends of dogs 68 bak and down.

Each of the secondary conveyors, 48, 49 supports a plurality of spaced rolling assemblies 110, 111, 112, 113, as seen in FIG. 1, on conveyor 48. The rolling assemblies have been removed from conveyor 49 in that Figure to more clearly illustrate the assembly guides. Turning now to FIGS. 5 and 6, wherein the rolling assembly 111 is shown in transverse section, it can be seen that each assembly comprises a shaft housing 115 attached to a pair of flanged chain links 117, 118 which are a part of the secondary conveyor chain 48 which rests upon chain guide 120. Each of the secondary conveyors 48, 49 is of similar design with the exception of the opposite orientation of the rolling assemblies with respect to the center of the conveyor.

Each housing 115 of each rolling assembly has a transverse bushing 122 which preferably has a cylindrical outer surface 123 and an elongate hexagonal inner surface 124 which journals a hexagonal fork bar 125 which is slidable in the bushing which in turn is rotatable in the housing 115.

Retainer runners 127, 128 with bottom contact bands 129 of a relatively low friction material, such as "Delrin," extend approximately the length of the upper run of each of the secondary conveyors to insure vertical placement of the rolling assemblies as they traverse the tables 55.

Each fork bar terminates outwardly in a wheel 131 which is free to rotate with respect to the bar. Intermediate each wheel and each housing 115 a spur gear 132 with a hexagonal bore is slidably mounted on each bar 125. A retainer strip 133 fixed to table 55 keeps the gear in line with a gear rack 134. On each bar end opposite the gear are mounted fork tines 136, 137. Each tine tapers to a sharp edge 138. Each wheel 131 runs in the track 56 between guides 57, 58 to induce reciprocation of its fork bar with respect to its housing between the position shown in full lines in FIG. 5 and the broken line fork position 136A and wheel position 131A.

As can be seen from FIG. 1, the innermost reciprocation of the fork coincides with the beginning of the gear rack 134 on each table 55 adjacent each secondary conveyor. Thus, as the inward reciprocation of each fork into concave platen section 69 engages the tines 136, 137 with the partially folded food item on the platen 12, the gear 132 of each rolling assembly engages the rack and imparts rotation to the fork bar, causing the tines to rotate about the axis of the bar and roll the food item upon itself on an axis transverse to the progress of the conveyor.

As the food item is rolled upon itself, the elevation of the fork with respect to the platen increases, since the platen acts as a rolling bed. The central conveyor and the secondary conveyors carrying the rolling housings must therefore diverge at a slight vertical angle. It is presently preferred to elevate the downstream end of the secondary conveyors.

It is also important that the spacing of the forks match the spacing of the platens and that the travel of each of the three conveyors be synchronized such that the paired rolling assemblies of the two secondary conveyors coincide with the concave zone 69 of the correlative platen such that the rolling assemblies align transversely in order to roll the food item along a common axis on the part of each rolling assembly pair. In the illustrative embodiment the three conveyors are commonly driven and the synchronization between them may be controlled by careful consideration of the travel length of each of the chains. In those embodiments wherein the chains are separately driven, electrical control means such as limit switches, may be utilized to synchronize the travel of the conveyors.

While separate rolling assembly conveyors have been illustrated, it is not precluded to support the rolling assemblies from the first or central conveyor in alignment with each platen. However, such an arrangement increases the number of rolling assemblies necessary and increases the load on the power supply.

FIG. 9 illustrates an alternate embodiment of the invention wherein each fork bar 125 of each rolling assembly terminates in a sphere or ball 141 rotatably attached to the fork bar by an axle pin 143 shown in dotted lines in FIG. 9. A guide track 56A on each table 55 has a semicylindrical guide groove 145 which contains each ball 141 and guides the balls in the engaging and disengaging fork reciprocation, as the track undulates transversely. The reciprocating motion is imparted to fork bars 125 and their respective fork tines 136, 137 in the same manner described with respect to the previously described embodiment.

The embodiment of FIG. 9 utilizes a guide track 56A which opens horizontally, instead of opening vertically as does the track 56 of the previously described embodiment. In each embodiment a retainer strip 133 fixed to table 55 cooperates with vertical retainer runners 127, 128 to maintain the rolling assemblies in alignment with the gear rack 134. The hub 151 of each gear 132 of each embodiment may be a flatted cylinder such that the flat 152 (FIG. 5) rides upon the top of the retainer strip to orient the tines of each fork so that the tines align vertically for proper engagement with the wrap on the platen prior to meshing of the gears and the racks 134. In each cycle of the rolling assemblies the strips 133 on each table 55 reorient the forks after the conveyed forks traverse the end sprockets 61 and the gear hubs contact the strips. Flared guide track portions 154 (FIG. 1) serve to locate the fork bars with respect to the strip prior to engagement between the strip and the gear hubs. Similar flaring (not shown) of the guide groove 145 of the embodiment of FIG. 9 serves the same purpose.

In the practice of the invention on the illustrative apparatus, vacuum arm 87 transfers a tortilla wrap from stack 85 to one of successive platens 12 carried by conveyor 40. The loaded platen passes beneath filler 95 which automatically deposits a metered amount of filler from synchronized metering valve 96 onto the wrap. As the conveyor progresses downstream platen cam dogs 68 encounter cam 71, articulating platen portion 17 forwardly to compose a first fold line 15 and fold 16 on the wrap. The side margins of the wrap are engaged by side plows 24, 25 as the conveyor progresses. The cam dogs encounter cams 105 part way through the plows and articulated portion 17 is retracted to free the wrap for further processing.

The side guides 101, 102 of the side plows conduct the side margins of the wrap upwardly and inwardly as the guides converge toward the conveyor and bend them downwardly into overlap portions 18, 19 along second fold lines 21, 22, respectively. Preferably, when a circular tortilla wrap is used, the side lines 21, 22 also converge downstream, departing slightly from parallel with the path of the conveyor, to prevent "butterflying" of the wrap as the wrap is rolled.

A rolling assembly pair is brought into position with a platen 12, as shown, for instance, by the position of the rolling assembly 110, as the platen and its wrap and filler enter the side plows. The track guides 56 induce inward motion of the fork bars while the strips 133 guide the gears into meshing contact with gear racks 134 as the fork tines engage the folded wrap. As the secondary outboard conveyors proceed in synchronization with the first conveyor, the engagement of the gear and rack rotates the fork bars, spirally winding the engaged wrap and filler upon itself. The conventional burrito has from one and a half to three and a half folds, depending on the material and the amount of filler, the number of turns induced being predetermined by rack length and gear-to-rack ratios.

The terminal margin of the wrap may be sprayed from a binder supply 157 in the last roll. If the wrap material dictates, the wrap may be sprayed alternatively from a forward supply 158 ahead of the side plows to allow the spray to penetrate the wrap to make it tacky when rolling is completed.

It is preferred to compress the rolled tortilla and filler such that the cross section is oblate rather than circular. The inventive apparatus therefore provides upper and lower squeeze belts 161, 162, respectively, which in conventional fashion pass about end rollers 164, 165 located adjacent the conveyor shaft 43. The roller suspension and drive may be conventional, and are therefore not illustrated. The foodstuff upon the platen 12 transfers to the space between the belts and is compressed vertically as the belts converge about rollers 164, 165 downstream to carry the foodstuff to further processing or packaging.

In some instances, it is desirable to continue rolling the foodstuff upon itself beyond the rolling imparted upon the platen. In such case, the upper belt 161 is maintained in motion while the lower belt 162 becomes relatively static, thus rolling the foodstuff upon the lower belt by the action of the upper belt. The relative motion of the two belts may be achieved by conventional controls and rolling may be imparted by a mere differential in linear speed of the two belts.

It can thus be seen that a single apparatus may accommodate several different foodstuffs by simple manipulation of the terminal rollers and by proper disposition or elimination of the side plows.

Preferably the plows and their side guides 101, 102 are adjustable transversely with respect to the center line of the conveyor 40 to accommodate the different wraps and fills.

The method of the invention is adapted to many different folded and rolled foodstuffs and is ideally implemented by the versatile apparatus illustrative of the invention. Many variations in the method and the apparatus within the scope of the invention, other than those set forth in this specification, will be apparent to those skilled in the art. It is therefore desired that the scope of the invention be defined by the appended claims rather than by the illustrative description set forth herein.

I CLAIM:

1. A process for preparing folded foodstuffs having an exposed terminal margin comprising the steps of depositing an outer flat wrap on a conveyor, adding a filler substance atop the flat wrap, folding the wrap along a first line transverse to the travel of the conveyor, engaging the partially folded wrap with its filler with transversely extending forks from opposite sides of the line of the conveyor, rotating said forks about an axis transverse to the line of the conveyor to roll said partially folded wrap spirally upon itself, and withdrawing said forks from engagement with the rolled wrap.

2. A process in accordance with claim 1 further comprising the step of altering the rolled thickness of the foodstuff by passing said rolled wrap and filler beneath compressing means.

3. A process in accordance with claim 1 further comprising the step of passing the foodstuff between an upper and a lower longitudinal belt, and driving one belt at a higher speed than the other belt while each of said belts is in contact with an opposite side of the foodstuff so as to further roll the foodstuff upon itself.

4. A process in accordance with claim 1 further including the step of adhering the exposed transverse terminal margin of the wrap to the next adjacent layer of the rolled wrap.

5. A process in accordance with claim 1 including the further step of impinging the side margins of the wrap upon converging guide walls to fold the side margins of the wrap about the filler along second lines approximately parallel to the path of the conveyor.

6. A process in accordance with claim 5 including the further step of spraying the wrap with a binder prior to completion of the rotation of the forks.

7. A process in accordance with claim 6 wherein the spraying step comprises applying a water spray to the wrap adjacent the exposed margin thereof, and pressing the margin into contact with the moistened area.

8. Apparatus for forming a food portion having an exterior wrap with terminal and side margins and an inner filling comprising a continuous conveyor, a plurality of support platens on the conveyor, each platen having a static portion and an articulated portion; a filling dispenser adapted to deposit a filling onto a wrap positioned on each platen, means for moving the articulated portion of each platen to fold the wrap along a first line transverse to the travel of the conveyor; a plurality of transversely extending forks, transport means for carrying the forks coordinately with the travel of the conveyor, means for rotating each of the forks carried by the transport means, means for moving each fork on the transport means into engagement with the wrap on the platen of the conveyor, and means for disengaging each fork on the transport means from the rolled wrap.

9. Apparatus in accordance with claim 8 further comprising a bonding medium dispenser on the apparatus adapted to dispense bonding medium onto the wrap on the conveyor.

10. Apparatus in accordance with claim 8 further comprising compression means adapted to compress each rolled wrap at the end of the conveyor.

11. Apparatus in accordance with claim 10 wherein the compression means comprises vertically separated upper and lower longitudinal belts, the said belts converging downstream to a spacing less than the height of the foodstuff leaving the conveyor.

12. Apparatus in accordance with claim 8 comprising guide means adjacent the conveyor for folding each side margin on the wrap inwardly along a line approximately parallel to the extent of the conveyor.

13. Apparatus in accordance with claim 8 wherein the transport means supporting the plurality of transversely extending forks comprises a second and a third outboard conveyor, each outboard conveyor traversing a path parallel to the first conveyor, and each supporting a plurality of forks each of which is transversely aligned with a fork on the other outboard conveyor, means for coordinating the travel of the three conveyors, and means for rotating each of the plurality of forks carried by each outboard conveyor, means for moving each fork into engagement with the wrap on the platen of the first conveyor, means for disengaging each fork from the rolled wrap, and means for coordinating the engaging and the disengaging means of the second and third conveyors.

14. Apparatus in accordance with claim 8 wherein the means for rotating each of the forks carried by the transport means comprises a housing, a fork bar reciprocable in the housing and rotatable therein, a gear slidably keyed to the fork bar, and a gear rack adapted to mesh with the gear extending parallel to the path of the conveyor.

15. Apparatus in accordance with claim 8 wherein the means for moving each fork on the transport means into engagement with the wrap and the means for disengaging each fork on the transport means from the wrap comprises a housing on the transport means, a fork bar slidably and rotatably mounted within the housing, the fork being mounted to one end of the fork bar, a rolling member rotatably mounted to the opposite end of the fork bar, and a guide track accepting the rolling member, said guide track having a path with portions varying spaced from the conveyor.

16. Apparatus in accordance with claim 15 wherein the guide track opens horizontally.

17. Apparatus in accordance with claim 15 wherein a guide track opens vertically.

18. Apparatus in accordance with claim 15 wherein the rolling member is a wheel.

19. Apparatus in accordance with claim 15 wherein the rolling member is a sphere.

20. Apparatus in accordance with claim 11 further comprising a drive roller for each longitudinal belt, drive means for each roller and control means for the drive means on at least one roller to vary the peripheral speed of said roller with respect to the peripheral speed of the other roller.

* * * * *